(No Model.)

W. C. HOMAN.
LAMP BRACKET.

No. 600,535. Patented Mar. 15, 1898.

WITNESSES:
Frank S. Ober
L. Vreeland

INVENTOR:
William C. Homan.
BY
ATTORNEY

THE NORRIS PETERS CO., PHOTO-LITHO., WASHINGTON, D. C.

UNITED STATES PATENT OFFICE.

WILLIAM C. HOMAN, OF MERIDEN, CONNECTICUT, ASSIGNOR TO THE EDWARD MILLER & COMPANY, OF SAME PLACE.

LAMP-BRACKET.

SPECIFICATION forming part of Letters Patent No. 600,535, dated March 15, 1898.

Application filed August 17, 1897. Serial No. 648,534. (No model.)

*To all whom it may concern:*

Be it known that I, WILLIAM C. HOMAN, a citizen of the United States, residing at Meriden, New Haven county, Connecticut, have invented certain new and useful Improvements in Lamp-Brackets, of which the following is a full, clear, and exact description.

My invention relates to improvements in lamp-brackets; and it consists in providing a novel mechanical means whereby the clamping members thereof may be readily and quickly attached to or detached from the frame of a bicycle or other vehicle without the necessity of detaching the clamping bolt or nut.

The object of my invention is to provide a simple, inexpensive, and effective means whereby the above ends may be accomplished.

My invention is illustrated by the accompanying drawings, in which—

Figure 1:
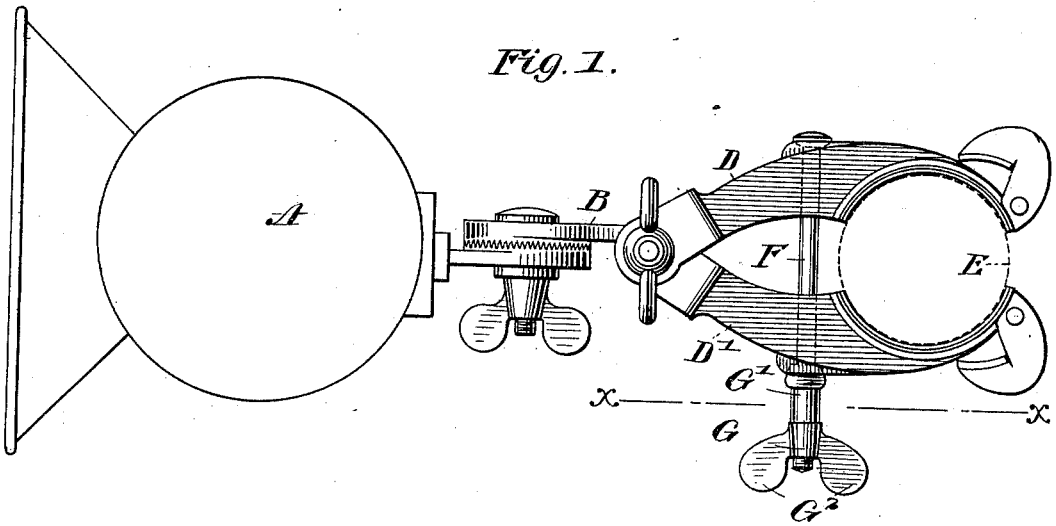
Figure 2:
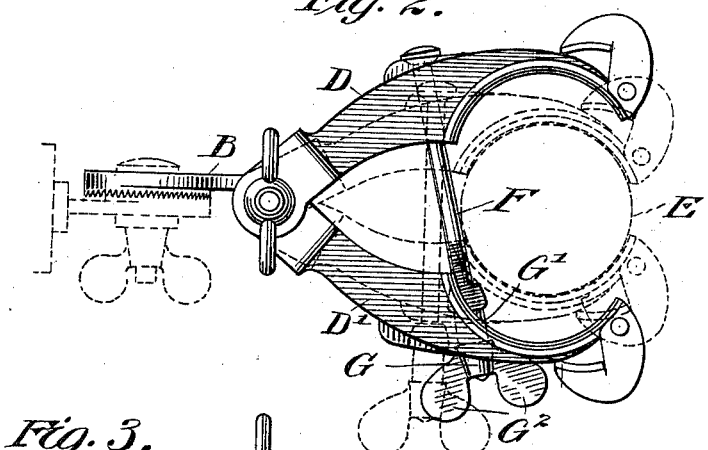
Figure 3:
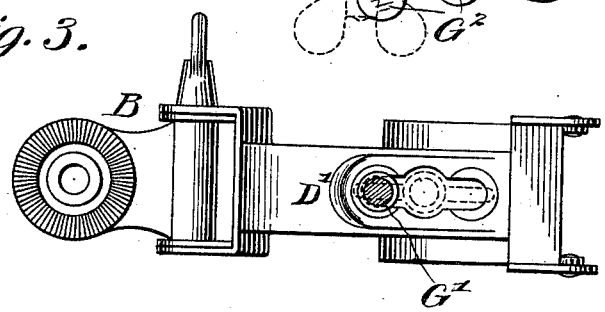

Figure 1 is a plan view, the clamping members being in the engaged position upon the frame of a bicycle or other vehicle. Fig. 2 is a similar view illustrating the position of the parts when it is desired to detach the bracket from said frame; and Fig. 3 is a side elevation of Fig. 1, partly in section, on the line $x\ x$.

The clamping members of my present invention correspond substantially with the clamping members of the bracket shown in my earlier patent, No. 575,779, of January, 26, 1897. It will be apparent, however, from the following description that the present invention is applicable to any form of lamp-bracket in which there are a pair of jaws having means adapted to draw said jaws toward each other to embrace the main supporting part.

In the drawings, A is a lamp suitably secured to a supporting member B of a bracket.

D D' are clamping-jaws of the bracket suitably shaped toward their outer ends to clasp the frame of a bicycle or other vehicle.

E is the tubular head of a bicycle.

The members D D' are shown in the holding position in Fig. 1, while Fig. 2 shows them in position to permit the complete detachment of the bracket from the frame.

F is a bolt, headed at one end, passing through suitable openings in the clamping members D D'. The opposite end of the bolt is screw-threaded and carries an adjusting-nut G. The bolt and nut constitute what I shall term for the purposes of this description a "through-fastening." G' is an elongated shank, preferably on said nut. Suitable means, such as wings $G^2\ G^2$, are provided, whereby the nut may be readily turned. In the clamping-arm D' is formed an elongated slot of varying width. (See Fig. 3.) The width of this slot at one end is only slightly greater than the diameter of the bolt F. The width of the slot at the opposite end or at an intermediate point in the length thereof, as desired, is only slightly greater than the diameter of the nut-shank G. Referring to Fig. 1, the bolt F is shown at the forward end of the slot in the clamping-arm D, and the inner end of the elongated shank G', which acts as a clamping-shoulder, is seated toward the forward end of the slot in member D' in a suitable notch or depression. At this point the width of the slot is not sufficient to allow the shank $G^2$ to slip through.

When it is desired to detach the bracket, the nut G is first unscrewed slightly. Then by swinging the bolt into the position shown in Fig. 2 the shank G' of the adjusting-nut will be caused to register with the cut-out or widest portion of the slot in the arm D. Then the jaws may be readily opened to an extent sufficient to permit the outer ends of the clamping members to free the frame E, the shank of the nut passing freely through the enlarged part of the said slot. (See Fig. 2.) To attach the bracket to the frame, the steps above described are reversed.

In my previous patent the complete detachment of the bracket was accomplished by loosening the nut and then detaching the head of the bolt from its clamping member; or the same end could be accomplished by unscrewing the nut a very considerable distance. Either of said ways required considerable time and annoyance. By the present means it is necessary to unscrew the nut enough only to allow the bolt to be tilted, so that the nut-shank G' will register with the widest portion of the slot in the clamping-arm D', and then the jaws may be opened to an extent sufficient to free the frame. It is desirable that the wings $G^2$ $G^2$ of the nut G have sufficient spread to prevent the nut slipping entirely through the slot in the member D', and when so constructed the wing or wings at the outer end of said nut form what may be termed a "stop-shoulder." It is clear that the widest portion of the slot in the clamping-arm D' may be either at an intermediate point in the length of the slot or at one end thereof, as desired. In some forms of brackets it is desirable that there be provided two positions for the adjusting-bolt, the purpose being to get the bolt as near the frame with which the jaws engage as possible. In this latter case it is desirable that the opening for the nut-shank be formed between said positions, as shown by the accompanying drawings. It is manifest that a means, such as the shank G', might be provided between the head and body of the bolt F instead of on the nut, in which event the slot adjacent thereto would have to be widened at a suitable point to provide a shank-opening, and such a difference would constitute a mere difference in degree. In carrying out my invention these and other changes in the particular construction and arrangement of the parts is anticipated, and it is not my intention to limit myself to the single form shown and described, but to hold myself at liberty to make such alterations and changes as are fairly within the spirit and scope of the invention.

What I claim is—

1. In a lamp-bracket having a pair of clamping members, a through-fastening therefor, said through-fastening being provided at one end with a clamp-shoulder and a stop-shoulder, openings in the clamping members for said through-fastening, one of said openings being elongated and having a cut-away portion at one point to permit the free passage of the clamp-shoulder.

2. In a lamp-bracket having a pair of clamping members, a through-fastening therefor, comprising a bolt and nut, the nut member having an inwardly-directed shank and a clamp-shoulder and a stop-shoulder, a slot in one of said clamping members adjacent said clamp-shoulder, said slot being cut away at one point to permit the free passage of said clamp-shoulder.

Signed at Meriden, in the county of New Haven and State of Connecticut, this 13th day of August, 1897.

WILLIAM C. HOMAN.

Witnesses:
F. T. WILLIAMS,
ALFRED DUNLOP.